United States Patent
Hald et al.

(10) Patent No.: US 10,992,417 B2
(45) Date of Patent: Apr. 27, 2021

(54) RADIO FREQUENCY COMMUNICATION SYSTEM AND METHOD

(71) Applicant: Kamstrup A/S, Skanderborg (DK)

(72) Inventors: Flemming Hald, Hadsten (DK); Johnny Dørken Christiansen, Galten (DK)

(73) Assignee: Kamstrup A/S, Skanderborg (DK)

(*) Notice: Subject to any disclaimer, the term of this patent is extended or adjusted under 35 U.S.C. 154(b) by 222 days.

(21) Appl. No.: 16/312,796

(22) PCT Filed: Jun. 29, 2017

(86) PCT No.: PCT/EP2017/066131
§ 371 (c)(1),
(2) Date: Dec. 21, 2018

(87) PCT Pub. No.: WO2018/002222
PCT Pub. Date: Jan. 4, 2018

(65) Prior Publication Data
US 2020/0313798 A1 Oct. 1, 2020

(30) Foreign Application Priority Data
Jun. 30, 2016 (EP) ..................................... 16177152

(51) Int. Cl.
*H04L 1/00* (2006.01)
*H04W 12/04* (2021.01)
(Continued)

(52) U.S. Cl.
CPC .......... *H04L 1/0061* (2013.01); *H04L 5/0055* (2013.01); *H04W 12/0013* (2019.01); *H04W 12/0401* (2019.01); *H04W 12/04031* (2019.01)

(58) Field of Classification Search
None
See application file for complete search history.

(56) References Cited

U.S. PATENT DOCUMENTS 9,973,515 B1 * 5/2018 Corbett ............... H04L 63/1408
10,091,075 B2 * 10/2018 Hegde ..................... H04J 11/00
(Continued)

FOREIGN PATENT DOCUMENTS

CN      1711741 A    12/2005
CN    101060405 A    10/2007
(Continued)

OTHER PUBLICATIONS

The International Search Report and the Written Opinion of the International Searching Authority for Corresponding International Application PCT/EP2017/066131 dated Sep. 26, 2017.
(Continued)

*Primary Examiner* — Otis L Thompson, Jr.
(74) *Attorney, Agent, or Firm* — Renner, Otto, Boisselle & Sklar, LLP

(57) ABSTRACT

Radio frequency communication method for wirelessly transmitting data packets between two communication nodes of a communication network, the method comprising the steps of generating a data packet including payload data and a first data check value a, transmitting the data packet from the first node to a second node; and determine whether the data packet is transmitted correctly by calculating a second data check value based on the received payload data and comparing the second data check value to the first data check value to; if the data packet is received correctly, transmitting from the second node to the first node an acknowledgement packet including a first acknowledgement check value wherein the first acknowledgement check value provides stronger assurances about data integrity of the received payload data than the first and second data check values; and at the first node, calculating a second acknowledgement check value based on the original payload data, and determining whether the data received at the second node matched the data originally sent from the first node.

9 Claims, 2 Drawing Sheets

(51) Int. Cl.
*H04W 12/00* (2021.01)
*H04L 5/00* (2006.01)

(56) References Cited

U.S. PATENT DOCUMENTS

| | | | | |
|---|---|---|---|---|
| 2009/0034526 A1* | 2/2009 | Ahmadi | ............... | H04L 69/04 |
| | | | | 370/392 |
| 2014/0119213 A1* | 5/2014 | Devarasetty | ............ | H04L 1/24 |
| | | | | 370/252 |
| 2016/0085619 A1* | 3/2016 | Iyer | .................. | G06F 13/4221 |
| | | | | 714/807 |
| 2016/0191678 A1* | 6/2016 | Brandeburg | ......... | H04L 69/166 |
| | | | | 370/392 |
| 2016/0218832 A1* | 7/2016 | Dabeer | ............... | H04L 1/0073 |

FOREIGN PATENT DOCUMENTS

| | | | |
|---|---|---|---|
| WO | 0213398 A2 | 2/2002 | |
| WO | 2004045186 A1 | 5/2004 | |

OTHER PUBLICATIONS

The International Preliminary Report on Patentability for Corresponding International Application PCT/EP2017/066131 dated Jun. 27, 2018.
Reply filed in response to The International Search Report and The Written Opinion of the International Searching Authority for Corresponding International Application PCT/EP2017/066131 dated Sep. 26, 2017.
The Extended European Search Report for Corresponding Application No. 16177152.2 dated Dec. 6, 2016.

\* cited by examiner

RADIO FREQUENCY COMMUNICATION SYSTEM AND METHOD

This application is a national phase of International Application No. PCT/EP2017/066131 filed Jun. 29, 2017 and published in the English language, which is an International Application of and claims benefit of priority to Patent Application No. EP 16177152.2, filed on Jun. 30, 2016. The disclosures of the above-referenced applications are hereby expressly incorporated by reference in their entireties.

FIELD OF THE INVENTION

The present invention relates to a radio frequency communication system and method for wirelessly transmitting data packets between two communication nodes of a communication network, wherein acknowledgement information is transmitted between the nodes to confirm successful transmission of a data packet.

BACKGROUND OF THE INVENTION

Automatic meter reading (AMR) systems and advanced meter infrastructure (AMI) systems are generally known in the art. Utility companies use such systems to read and monitor customer meters remotely, typically using radio frequency (RF) communication. AMR and AMI systems, commonly known as meter reading systems, increase the efficiency and accuracy of collecting readings and managing customer billing.

AMR systems generally use a mobile RF communication network for collecting meter readings and data, whereas AMI systems use a fixed RF communication network. Especially in AMI systems there may be multiple intermediate collectors located throughout a larger geographic area, each collector in turn communicating with a central back end system, for example by using a wide area network (WAN) or other suitable communication infrastructure. An AMI system may also utilize a system of repeaters or relay devices that expand the coverage area for each reader by forwarding meter readings and data. In a mobile network AMR environment, a handheld, vehicle-mounted, or otherwise mobile reader device with RF communication capabilities is used to collect data from meter devices as the mobile reader is moved from place to place.

A metering system for metering the consumption of a utility may include meter devices in the form of smart meters provided with communication devices for transmitting RF signals and receiver devices for receiving said RF signal. The communication devices may be configured to periodically transmit data packets including data representing multiple meter readings and other meter data as a function of time. Such data packets may be processed, transmitted and revised by the receiver device based on a standard signaling protocol, such as the wireless M-BUS protocol.

Meter devices are typically battery-powered, and consequently have a finite amount of energy available for their service cycle. Because the service cycle for meter devices is typically 10-20 years, to reduce cost associated with meter exchange or battery replacement, energy conservation is a major design criterion. However, for utility meters having electrical mains available as a power source, energy conservation related to communications is also desirable.

PCT application WO02/13398A2 discloses a frame forwarding scheme for network stations operating on a noisy medium. The scheme utilizes an acknowledge scheme in which received frames, which passes an integrity check based on a received frame check sequence included in the transmitted frame, are acknowledge by the receiving station, in that an acknowledge frame is send to the transmitting station. The acknowledge frame is including a subpart of the received frame check sequence for the purpose of identifying the frame which is being acknowledged.

PCT application WO2004/045186A1 discloses a method of communicating datagrams between terminals operating on an unreliable medium. Transmitted frames include redundancy check data to verify data integrity of received frames. Correct received frames are acknowledge by an acknowledgement datagram also including redundancy check data. The redundancy check data of the acknowledgement datagram being calculated utilizing the redundancy check data of the original datagram in order enable recognition of the acknowledgement datagram as a response to the original datagram.

As packet transmission accounts for a substantial portion of the energy usage in meter devices, more efficient transmission and reception can have a significant impact on the energy use, i.e. battery lifetime of the meter device. Thus, if the power used for transmitting data packets can be reduced, this will have a positive effect on the total power budget of the meter device. However, the transmission power used for communication purposes is often closely related to transmission quality and reception reliability.

Other important design criteria for utility meters are costs related to meter and communication devices, installation and the total cost of ownership of an AMI/AMR system for the utility provider. Batteries are a significant cost item for meter and communication devices; therefore, it is desirable to provide energy efficient devices that require less battery capacity, whereby component costs may be reduced.

Still another important design criterion is communication reliability between meter devices, repeaters, collectors and the backend system. Meter readings and other data, such as alerts or sensor data, may be transmitted in the form of data packets from the meter devices to the backend system, and the backend system may transmit data packets including commands or updates, to the meter devices. Reliability has to do with the robustness of the communication system and the ability of the system to successfully transmit a data packet from the sender, via possible intermediate devices, to the correct receiver. Data packets may be received in error for various reasons, such as increased path loss, collision, congestion or the like. If a packet does not successfully reach the receiver, it is necessary to retransmit the packet, which is undesirable.

OBJECT OF THE INVENTION

It is an object of the present invention to provide an alternative to the prior art. In particular, it may be seen as an object of the present invention to provide a system and a method for providing secure communication in a smart grid system that reduces power consumption in power critical devices, while ensuring reliable and robust signal transmission.

SUMMARY OF THE INVENTION

Thus, the above described object and several other objects are intended to be obtained in a first aspect of the invention by providing a radio frequency communication method for wirelessly transmitting data packets between two communication nodes of a communication network, the method comprising the steps of: at a first node, generating a data packet including payload data and a first data check value calculated based on the payload data; wirelessly transmitting the data packet from the first node to a second node; at the second node, receiving the data packet from the first node and calculating a second data check value based on the received payload data; at the second node, comparing the second data check value to the first data check value to determine whether the data packet is received correctly; if the data packet is received correctly, wirelessly transmitting from the second node to the first node an acknowledgement packet including a first acknowledgement check value calculated by the second node based on the received payload data, wherein the first acknowledgement check value provides a stronger data integrity check of the received payload data than the first and second data check values; and at the first node, receiving the acknowledgement packet from the second node and calculating a second acknowledgement check value based on the original payload data, and comparing the second acknowledgement check value to the first acknowledgement check value to determine whether the data received at the second node matched the data originally sent from the first node.

By calculating the first acknowledgement check value based on the received payload data, the acknowledgement packet includes information about the integrity of the payload data and the acknowledgement will only be accepted by the first node if the payload data has been correctly received at the second note, i.e. within an acceptable bit error rate.

Further, the stronger a data integrity check a check value provides, the more complex the check values usually is and the more space it usually requires to be transmitted in a data packet (i.e. requires more bits in the data packet). An example of a check value providing a stronger data integrity check is a CRC-16 compared to a CRC-8, taking up 17 and 9 bits respectively. Thus by reducing the integrity strength of a check value, the number of bits required for it to be included in a data packets can be reduced. In a communication system including a combination of battery and mains powered devices, it is advantageous to reduce the power consumption of battery devices at the expense of mains powered devices. Additionally, it consumer more power to transmit a data packet than it takes to receive a data packet. In the present invention, the first node may be part of a battery operated device, such as a meter device and the second node may be a mains powered device, such as a data collector device. Thus, by including a check value providing a less strong data integrity check in the data packets transmitted from the first node, power is saved at the first node. At the same time, a check value providing a stronger data integrity check is provided in acknowledgement packets transmitted from the second node to the first node. As both check values included in the data packet and the acknowledgement packet are at least partially base on the same payload data, the stronger check value of the acknowledgement packet compensates for the less strong check value of the data packet. Hereby powered is save at the first node without sacrificing the strength of the data integrity check of the payload data.

Moreover, the payload data of the data packet may be encrypted using a data encryption key stored in a non-volatile memory of the first node, and the data check values and the acknowledgement check values may be calculated based on the encrypted payload data.

Further, in the above described method, if the data packet is received correctly, a second data packet including the unencrypted or encrypted payload data may be transmitting from the second node to a third node, such as a backend system including a server; and encrypted payload data may be decrypting at the third node using the data encryption key (DEK) stored in a non-volatile memory thereof.

According to a second aspect of the method, the first acknowledgement check value included in the acknowledgement packet transmitted from the second node to the first node may be a first message authentication code (MAC1) generated by the second node using the received encrypted payload data and an acknowledgement key stored in a non-volatile memory of the second node; the method further includes the steps of, calculating at the first node a second message authentication code (MAC2) using the acknowledgement key stored in a non-volatile memory of the first node and the original encrypted payload data; and comparing the second message authentication code (MAC2) to the first message authentication code (MAC1) to determine whether the data received at the second node matched the data originally sent from the first node.

According to a second aspect of the method, the acknowledgement packet transmitted from the second node to the first node may further include key validity data indicating the period of validity of the acknowledgement key; and the method may further include the steps of, at the first node, deriving the acknowledgement key based on a key derivation function (KDF), the received key validity data and a serial number of the first node.

According to a third aspect of the method described above, the data packet encrypted by the first node and transmitted to the third node via the second node, may include an authentication code provided to secure that the server only receives and processes data packets from trusted nodes.

The present invention further relates to a radio frequency communication system comprising a first and a second communication node configured for bi-directional data communication, wherein the first node is configured to create and transmit to the second node a data packet including payload data encrypted using a data encryption key stored in a non-volatile memory of the first node and a first data check value calculated by the first node based on the encrypted payload data; the second node is configured to receive the data packet from the first node, calculate a second data check value based on the received encrypted payload data, and compare the second data check value to the first data check value to determine whether the data packet is received correctly; and, if the second node determines that the data packet is received correctly, it is further configured to create and transmit to the first node an acknowledgement packet including a first acknowledgement check value calculated based on the received encrypted payload data, the first acknowledgement check value providing stronger assurances about data integrity than the first and second data check values; and wherein the first node is configured to receive the acknowledgement packet from the second node and calculate a second acknowledgement check value based on the original encrypted payload data, and compare the second acknowledgement check value to the first acknowledgement check value to determine whether the data received at the second node matched the data originally sent from the first node.

BRIEF DESCRIPTION OF THE FIGURES

The radio frequency communication system and method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF EMBODIMENTS

The invention can be implemented by means of hardware, software, firmware or any combination of these. The invention or some of the features thereof can also be implemented as software running on one or more data processors and/or digital signal processors. The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Figure 1:
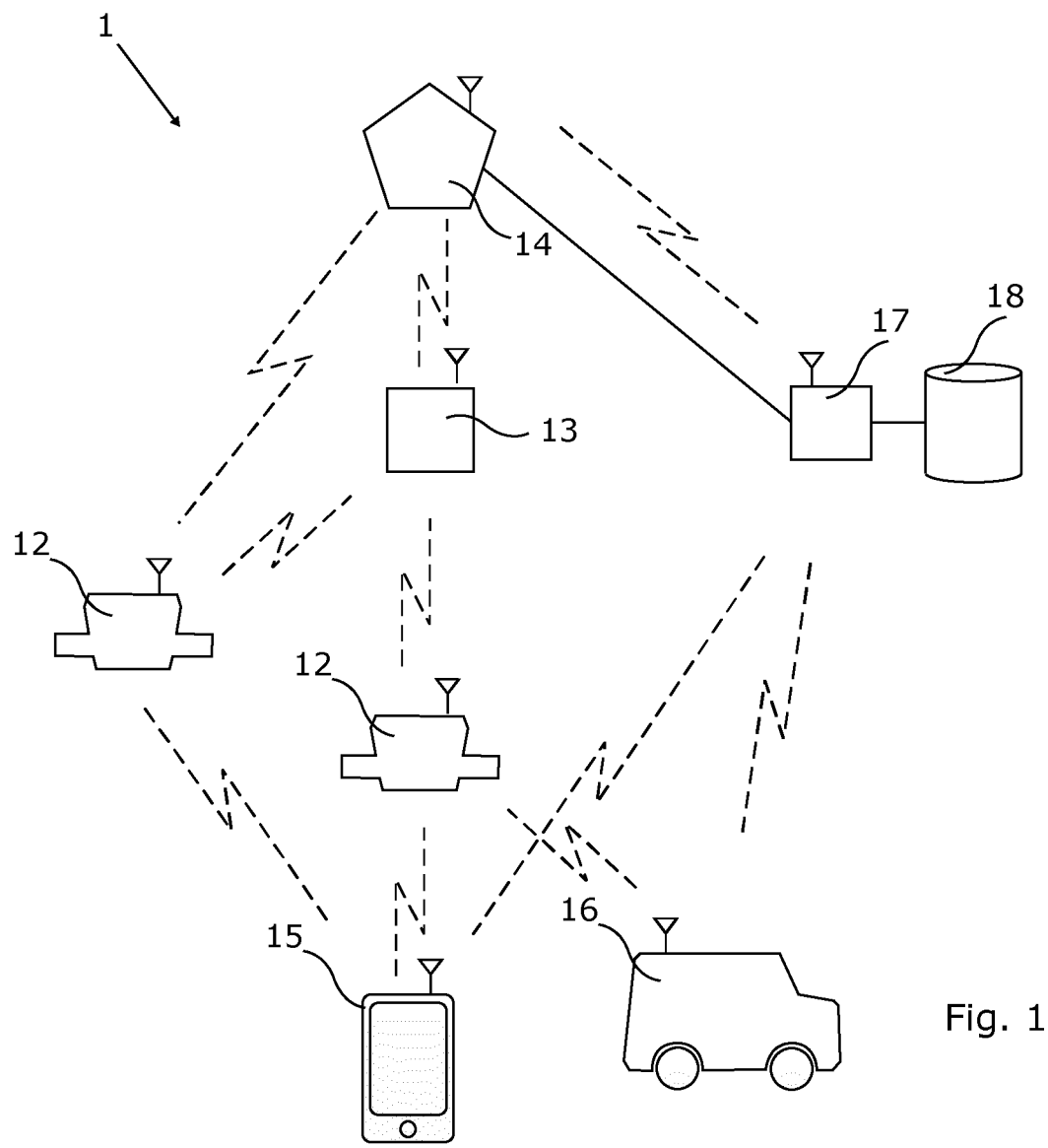
FIG. 1 illustrates a meter reading system comprising a plurality of consumption meters and various data collection devices.

Referring to FIG. 1, a radio frequency communication system 1 in the form of a meter reading system is shown. The meter reading system comprises a plurality of meter devices 12 installed at respective points of use and various receiver devices in the form of fixed and mobile collector devices 14, 15, 16. One embodiment of a communication system may incorporate different types of receiver devices, such as a combination of fixed and mobile receiver devices. In a system using fixed collector devices 14, a number of repeater devices 13 may be provided to relay data packets from meter devices distributed over a large geographic area. The number of repeater devices and collector devices required for a network depends amongst others on the size and topology of the network.

If the meter reading system is setup for one-way communication only, the meter devices are dedicated transmitter devices configured for transmitting data packets to the receiver devices. However, if the meter reading system is setup for two-way communication, the meter devices and the receiver devices 13, 14, 15, 16 may function as both transmission devices and receiver devices.

Each meter device measures the amount of a specific utility, such as water or electricity, delivered to the respective point of use via the utility network and stores corresponding consumption data in a memory of the meter device. In a processor of the meter device, consumption data is converted into data packets suitable for radio frequency communication, and the processor instructs a transmitter of the meter device to transmit the data packets to a receiver. In a two-way communication system, the transmitter of the meter device may be a transceiver configured to transmit and receive data packets, respectively.

From the collector devices, data from a plurality of meter devices is transmitted to a backend system 17 including a server 18 for storing, processing and analyzing consumption data. In a two-way system, data may also be transmitted in the opposite direction, from the backend system to the respective meter devices. Further, meter devices may be configured for communication with multiple receiver devices, and a meter device may be configured as a receiver device for relaying data packets from another meter device to a receiver device.

It is understood by the skilled person that other network devices such as router devices or meter devices equipped with different communication modules may also be included in the communication system. At least communication between meter devices and collector- and repeater devices is based on RF communication, whereas the transmissions between collector devices and the backend system may be of any suitable type, such as wired or wireless. Additionally, a collector device may be located either together with the backend system or remotely located from the backend system. Further, it is understood by the skilled person, that for illustrative purposes, the shown meter reading system includes a limited number of network components only.

As described above each meter device of FIG. 1 may be a transmitter device 12, which is configured for encoding and transmitting a data packet to a receiver device 14. The receiver device on the other hand being configured to receive and decode the transmitted data packet. Further, the meter devices are often battery operated devices having a limited amount of power available during their lifetime. Therefore, it is advantageous to reduce power consumption at the meter devices at the expense of power consumption at the collector devices 14, often being mains powered.

Figure 2:
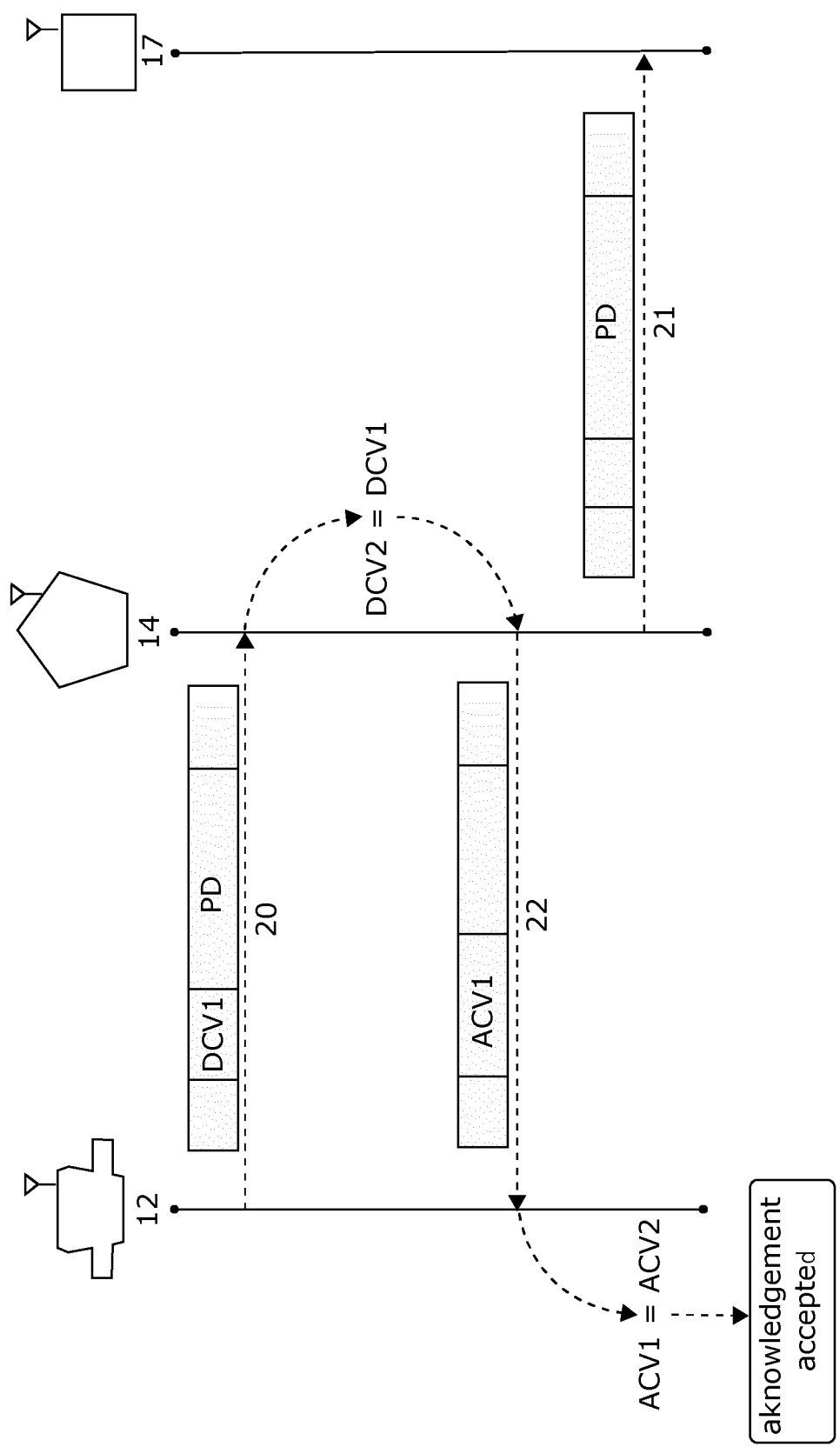
FIG. 2 is a schematic system-chart representing an outline of the method for transmitting data and acknowledgement packets between different nodes of a communication system.

Referring to FIG. 2, a method for sending data packets and acknowledging receipt of such data packets in the radio frequency communication system will be described in further detail. Data packets are sent between different nodes of the communication system, such as between a meter device 12 and collector device 14 and between a collector device and a concentrator device or backend system 17. Such data packets may include as part of its payload PD consumption data collected from the meter devices for billing purposes.

When data packets are transmitted, they may collide with other data packets or fail to reach the receiver for other reasons. If transmission is not successful, retransmission is often required. However, transmission of the same data multiple times is undesirable due to increased power consumption. Therefore, it is desirable to be able to determine when packets have been successfully transmitted, to avoid retransmissions.

One way of providing information about successful transmission is by sending an acknowledgement signal from the receiver to the transmitter following the successful reception of a data packet. Before the receiver can transmit such acknowledgement signal to the transmitter, the receiver must first determine whether the data packet has been successfully received. By successfully received is meant that the data packet is received without irreparable bit errors or within an acceptable bit error rate.

According to embodiments of the present invention a data packet 20 is wirelessly transmitted between two communication nodes such as a meter device 12 and collector device 14. During the transmission the data packet is possibly relayed by a repeater device 13, which simply repeats received data one to one.

At the first node a processor generates the data packet 20. In the case of a meter device, the processor may receive measurement data for a metering unit. As part of the packet generation process the processor may authenticate and encrypt the payload data using a data encryption key (DEK) stored in a memory of the node. In one embodiment, authentication is effectuated by including an authentication code in the encrypted payload data. In other embodiments, the payload is transmitted in an unencrypted state. Further, the processor calculates a first data check value (DCV1), such as a cyclic redundancy check value (CRC), based on the encrypted or unencrypted payload data. The final data packet 20 includes the payload data and the calculated first data check value. The data packet is then transferred to a transmitter of the first node 12 and transmitted to the second node 14.

At the node/collector device 14 a transceiver receives the data packet transmitted from the first node/meter device 12. Following reception and decoding of the data packet, a processor of the collector device calculates a second data check value (DCV2) based on the received payload data or encrypted payload data. In the embodiment wherein the payload data is encrypted, the second data check value may thus be calculated without decrypting the payload data. By comparing the calculated second data check value (DCV2) to the received first data check value (DCV1), the collector device is able to determine whether the data packet has been successfully received, i.e. the integrity of the received data packet is verified.

When it has been determined by the collector device that the data packet has been successfully received, the collector device generates an acknowledgement packet in the form of a data packet for transmission to the meter device. As part of its payload the acknowledgement packet includes a first acknowledgement check value (ACV1) calculated by the collector device based on the encrypted or non-encrypted payload data included in the received packet. The first acknowledgement check value is an error detection code providing a stronger data integrity check about data integrity of the packet payload data than the data check values (DCV1, DCV2) used in the data packet initially transmitted from the first node. More specifically the first acknowledgement check value may be longer than the data check values, i.e. include more bits. Other methods known to the skilled person may however also be used to increase the strength of the integrity check provided by the first acknowledgement check value. In one embodiment the first acknowledgement check value may be of the cyclic redundancy check (CRC) type, whereas the first and second data check values may be simple cyclic redundancy check values. Alternatively, the first acknowledgement check value may be a message authentication code (MAC), which requires an acknowledgement key to be stored in a memory of the collector device.

The underlying concept is that the data packet, i.e. the acknowledgement packet including the stronger integrity check, which requires more transmission power to transmit, is transmitted from a node having more available power than the node transmitting the data packet including the weaker integrity check. In the present example, the often mains powered collector device and the battery powered meter device, respectively.

The first node/meter device is programmed to activate its transceiver a predetermined period of time after transmission of the first data packet. Hereby a listening window is provided for the first node to receive incoming data packets. Transmission of the acknowledgement packet from the second node/collector device is timed accordingly, such that the first node is in a state wherein the acknowledgement packet can be received.

At the first node a second acknowledgement check value (ACV2) calculated based on the original encrypted or non-encrypted payload data, initially transmitted to the collector device. If the original encrypted payload data and the encrypted payload data received by the collector is identical, the first and second acknowledgement check values should be identical. Therefore, by comparing the second acknowledgement check value to the first acknowledgement check value the meter device is able to determine whether the data received at the second node matched the data transmitted. The meter device thus compares the first and second acknowledgement check value and when it has determined that the data transmitted to the second node matched the data received by the second node, the acknowledgement is accepted and the meter device knows that no retransmission is required. On the other hand, if no acknowledgement packet is received or the first and second acknowledgement check values indicate that the data received by the second node deviates from the data transmitted, the meter device may take the necessary measures to secure correct transmission of the payload data/consumption data. According to exemplary embodiments, the meter device may retransmit the data packet or include the payload information in a subsequent data packet.

In the embodiment wherein the first acknowledgement check value is a message authentication code, in the following denoted the first message authentication code (MAC1), the first message authentication code is compared to a second message authentication code (MAC2) calculated at the first node using an acknowledgement key and the original encrypted payload data. As described above the first message authentication code is generated by the second node using the received encrypted payload data and an acknowledgement key stored in a memory of the second node. The acknowledgement key may be provided to the second node by various means known to the skilled person. For example, the acknowledgement key may be stored in the memory of the second node at the time of configuration. Alternatively, the acknowledgement key may be distributed to the second node after installation, e.g. via software download.

Calculation of the second message authentication code (MAC2) at the first node also requires access to the acknowledgement key, which may be stored in a memory of the first node. As described in connection with the second node, the acknowledgement key may also be provided to the first node in a number of ways. In one embodiment the acknowledgement key may be derived or calculated at the first node based on key information included in the acknowledgement packet transmitted from the second node. To this end the acknowledgement packet may include key validity data related to the period of validity of the acknowledgement key, and the acknowledgement key may be derived at the first node based on a key derivation function (KDF), the received key validity data and a serial number of the first node. By enabling the first node to derive the acknowledgment key using a key derivation function and key information provided with the acknowledgement packet 22, acknowledgement keys need not be provided at the first node in advance. Not having to store one or more acknowledgement keys at the first node in advance improves security associated with key management.

Referring again to the second node or the collector node, when it has been determined that the data packet is received correctly based on the comparison of the first and second data check values, the collector node transmits the encrypted payload data to a third node. The third node may be the backend system 17 and the server 18. The encrypted payload data may be transmitted to the collector as part of an individual data packet or alternatively bundled together with payload data from other meter devices and sent in a common data packet.

At the third node, which may include the server 18 of the backend system 17, the decrypted and authenticated payload data is decrypted using the data encryption key (DEK) stored in a memory accessible by the third node/server. The authentication code included in the data packet ensures a strong integrity check and authentication of the data packet at the server level. The authentication code confirms the identity of the first node/meter device and causes the server only to receive and process data packets from trusted nodes/meter devices.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A radio frequency communication method for wirelessly transmitting data packets between two communication nodes of a communication network, the method comprising the steps of:
    at a first node, generating a data packet including payload data and a first data check value calculated based on the payload data;
    wirelessly transmitting the data packet from the first node to a second node;
    at the second node, receiving the data packet from the first node and calculating a second data check value based on the received payload data;
    at the second node, comparing the second data check value to the first data check value to determine whether the data packet is received correctly;
    when the data packet has been received correctly, wirelessly transmitting from the second node to the first node an acknowledgement packet including a first acknowledgement check value calculated by the second node based on the received payload data, the first acknowledgement check value providing a stronger data integrity check of the received payload data in that the first acknowledgement check value it comprises more bits than each of the first and second data check values; and
    at the first node, receiving the acknowledgement packet from the second node and calculating a second acknowledgement check value based on the original payload data available at the first node, and comparing the second acknowledgement check value to the first acknowledgement check value to determine whether the payload data received at the second node matched the payload data originally sent from the first node.

2. A method according to claim 1, wherein the payload data is initially encrypted at the first node using a data encryption key stored in a non-volatile memory of the first node, and wherein the subsequent calculation of data check values are based on the encrypted payload data.

3. A method according to claim 2, wherein calculation of the acknowledgement check values are also based on the encrypted payload data.

4. A method according to claim 2, further comprising the steps of:

if the data packet is received correctly, transmitting from the second node to a third node a second data packet including the encrypted payload data; and
    at the third node, decrypting the encrypted payload data using the data encryption key stored in a non-volatile memory of the third node.

5. A method according to claim 2, wherein:
    the first acknowledgement check value included in the acknowledgement packet transmitted from the second node to the first node is a first message authentication code generated by the second node using the received encrypted payload data and an acknowledgement key stored in a non-volatile memory of the second node;
    the second acknowledgement check value calculated by the first node is a second message authentication code calculated using the acknowledgement key stored in a non-volatile memory of the first node and the original encrypted payload data; and
    the second message authentication code is compared to the first message authentication code to determine whether the data received at the second node matched the data originally sent from the first node.

6. A method according to claim 5, wherein the acknowledgement packet transmitted from the second node to the first node further includes key validity data indicating the period of validity of the acknowledgement key; and the method further includes the steps of:
    at the first node, deriving the acknowledgement key based on a key derivation function, the received key validity data and a serial number of the first node, and
    storing the acknowledgement key in a non-volatile memory of the first node.

7. A method according to claim 4, wherein the data packet transmitted from the first node and relayed by the second node to the third node includes an authentication code provided to secure that a server only receives and processes data packets from trusted nodes.

8. A radio frequency communication system comprising a first and a second communication node configured for bi-directional data communication, wherein
    the first node is configured to create and transmit to the second node a data packet including payload data and a first data check value calculated by the first node based on the payload data;
    the second node is configured to receive the data packet from the first node, calculate a second data check value based on the received payload data, and compare the second data check value to the first data check value to determine whether the data packet is received correctly;
    the first node is configured to receive the acknowledgement packet from the second node and calculate a second acknowledgement check value based on the original payload data, and compare the second acknowledgement check value to the first acknowledgement check value to determine whether the data received at the second node matched the data originally sent from the first node; and
    if the second node determines that the data packet is received correctly, the second node is further configured to create and transmit to the first node an acknowledgement packet including a first acknowledgement check value calculated based on the received payload data, the first acknowledgement check value providing stronger assurances about data integrity in that the first acknowledgement check value comprises more bits than the first and second data check values.

9. A radio frequency communication system according to claim 8, wherein the payload data is initially encrypted at the first node using a data encryption key stored in a non-volatile memory of the first node, and wherein the subsequent calculation of data check values are based on the encrypted payload data.

\* \* \* \* \*